United States Patent Office 3,340,236
Patented Sept. 5, 1967

3,340,236
CHEMICAL COMPOSITION
Sylvan O. Greenlee, Lafayette, Ind., and Guy J. Crocker, North Brunswick, N.J., assignors, by mesne assignments, to Ciba Limited, Basel, Switzerland, a Swiss corporation
No Drawing. Filed June 4, 1962, Ser. No. 199,593
15 Claims. (Cl. 260—78.4)

The present invention relates to novel adducts suitable for reacting with polyepoxides and polyhydroxyl compounds for making infusible, solvent-resistant resins. The invention also includes novel conversion mixtures of such adducts with polyepoxides and polyhydroxyl compounds and the infusible solvent-resistant resinous products resulting therefrom.

It has heretofore been known that certain acid anhydrides may be used as curing agents for certain polyepoxides. The anhydrides of dicarboxylic acids, however, when used as hardeners in preparing polyepoxide resins have the weakness of generally requiring temperatures well above 100° C., and usually temperatures in the range of 150–250° C. for satisfactory conversion of the epoxides. Also, the reaction even at these temperatures generally requires the use of a tertiary amine catalyst in order to give the desired conversion. Even with the tertiary amine catalyst, many hours, sometimes as much as 10 to 20 hours at the elevated temperatures, is required. The anhydrides of dicarboxylic acids are also subject to loss through sublimation during the reaction with the result that they must be used either in closed systems or in very thick layers. Even where used in thick layers, however, this sublimation can result in non-uniformity and different properties in the final resin caused by sublimation of the anhydrides of the dicarboxylic acids near the surface of the resin mix. This sublimation, for example, makes it virtually impossible to use as a converting combination a polyepoxide and maleic anhydride in formulating protective coatings for industrial baking finishes.

Anhydrides of tetracarboxylic acids possess very limited miscibility with the commercially available polyepoxides and can generally only be blended with the polyepoxides by the application of heat or by other solubilizing means and tend to give very brittle conversion products. Accordingly, such polyanhydrides have found little or no use in conversion systems for polyepoxide resin reactions.

It has now been discovered that by reacting certain polymercaptans with certain acid anhydrides, novel highly functional polyacid anhydrides are obtained that are readily soluble with polyepoxides and soluble polyhydroxyl compounds at relatively low temperatures and will give resin cures with the same at temperatures as low as 75° C. These polyepoxide and polyhydroxyl resin compounds obtained through such reactions are novel compounds and are useful as coating and potting compounds as well as for the other uses for which epoxy resins are presently employed.

Acid anhydrides suitable for practicing the present invention are those in which the anhydride group is part of a closed five-member ring. The acid anhydride also has an ethylene linkage which may be between carbons attached to the five-member ring referred to, between carbons attached to such ring, or between the ring and an attached carbon. The ethylenic linkage should, however, be between carbons which are in the alpha-beta, beta-gamma or gamma-delta position with respect to one of the carbonyl carbons of the cyclic anhydride group.

As a polymercaptan for reaction with the acid anhydride, one may use any polymercaptan containing two or more mercaptan groups which are positioned in the compound no further than six carbons from a negative activating group. Examples of negative activating groups are ester (—COO—), alcohol (—OH), sulfide (—S—), ether (—O—), and carbonyl (—CO—). Polymercaptans of this general type may be represented by the general formula $R(—SH)_n$, where $n$ is at least two, and where R is an n-valent organic radical such that at least two of the —SH groups are no more than 6 carbon atoms removed from each other or from a negative activating group.

The preferred polymercaptans are the polymercaptoacid esters. Of these, the polymercaptoacetates and the polymercaptopropionates are preferred. The alcohol portion of the polymercaptoacid ester, in the order of general decreasing preference, may be given as pentaerythritols (mono, di and tri); trihydric alcohols including glycerol, trimethylol propane and trimethylol ethane; partial esters of the polyhydric alcohols such as the pentaerythritols, the triols and the glycols with vegetable oil acid (mono acids such as stearic and linoleic, dimerized and trimerized acids); glycols including ethylene, polyethylene, propylene and polypropylene glycols; starches; castor oil; and polyallyl alcohols.

The reaction between the polymercaptan and the acid anhydride can best be illustrated by using as an example maleic anhydride, tetrahydro phthalic anhydride, and itaconic anhydride and showing their reaction with a polymercaptan illustrated by the general formula HS—R—SH. The following type reactions are used for this purpose:

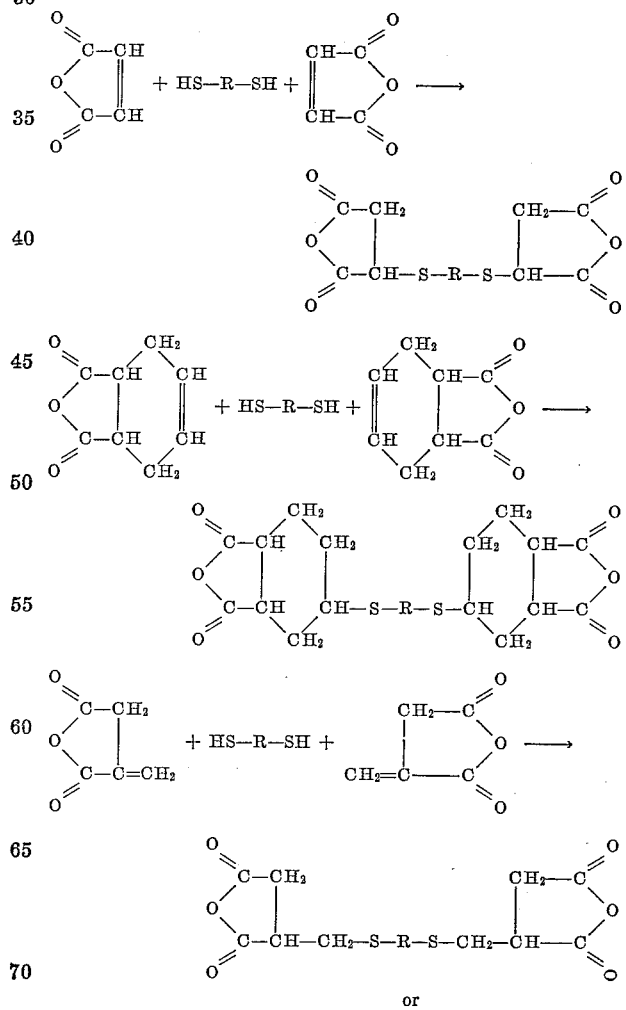

or

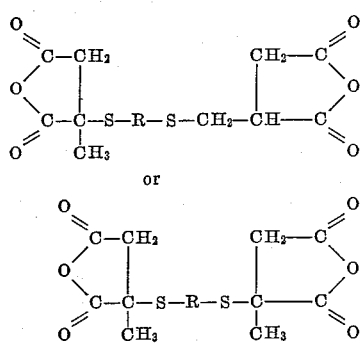

It is apparent from the above that the resulting products in each case have several acid anhydride groups, the number depending on the number of mercaptan groups per molecule in the polymercaptan used. These acid anhydride groups react readily with polyepoxides and polyhydroxyl compounds. A wide variety of adduct compounds can be prepared by using different polymercaptans and by using different acid anhydrides. The resulting highly functional thioxy polyacid anhydrides dissolve readily with polyepoxides and polyhydroxyl compounds and further react readily with these materials due to the presence of the acid anhydride groups. The term "thioxy" as used herein means "containing divalent sulfur as a connective between carbon atoms."

Various polymercaptans suitable for practicing the present invention are available, some of these being 1,4-butanedithiol; 2,3-dimercaptopropanol; toluene-3,4-dithiol; and alpha, alpha'-dimercapto-p-xylene. Other suitable active polymercaptans are the mercaptoacid esters of polyhydric alcohols and mercapto alcohol esters of polycarboxylic acids. Some of these are available as commercial materials and the preparation of others is illustrated by the following examples.

The esterifications of the mercaptoactic acid (MAA), mercaptopropionic acid (MPA) and adipic acid of these examples is carried out in a three-neck flask provided with a mechanical agitator for continuous stirring throughout the reaction period, a heating mantle, a thermometer and a water cooled reflux condenser attached through a water trap for water removal. The esterifications are carried out in the presence of refluxing toluene which serves to blanket the reaction mixture with its vapors and to remove the water of esterification into a water trap. In general the reactions are prolonged until the theoretical amount of water is removed. Viscosities as reported throughout are based on the Gardner Bubble Viscometer. Acid values as reported throughout are determined by titration with alcoholic KOH. Although the term "acid value" is used in connection with the titration of polymercaptans (Examples 1 through 12), it is actually the mercaptan groups which are being titrated, and the equivalent weights calculated therefrom are the mercaptan equivalent weights. The term mol as used in the examples refers to gram mol and the term equivalent refers to gram equivalent when used to denote reaction portions. Chemicals used are of a technical grade. Although a specified amount of toluene is given in a number of the examples, this specified amount is decreased or increased as needed to hold reflux at the indicated temperatures.

*Example 1.—Mercaptoacetate of triethylene glycol*

A reaction mixture of 1 mol triethylene glycol, 4 mols MAA and 500 mls. toluene is heated from 25° C. to 124° C. over 1 hour, at 124–140° C. for 1 hour, and at 140–153° C. for 2.5 hours. The mixture is freed of solvent and unreacted materials by distillation, reaching a pot temperature of 150° C. at 1–2 mm. mercury pressure to give a thin liquid residual product of 340 grams having an equivalent weight of 147 (acid value=382) compared to a theoretical value of 155.

*Example 2.—Mercaptoacetate of 1,4-butanediol*

A reaction mixture of 2 mols 1,4-butanediol, 6 mols MAA and 500 mls. toluene is heated from 29° C. to 100° C. over 0.5 hour, at 110–120° C. for 2 hours, at 120–138° C. for 2 hours, and at 138–151° C. for 2.5 hours. The mixture is stripped by distillation, reaching a pot temperature of 170° C. at 2 mm. mercury pressure. The residual liquid product of 495 grams has a viscosity of A3 and an equivalent weight of 137 (acid value=411) compared to a theoretical value of 125.

*Example 3.—Mercaptoacetate of 1,1,1-trimethylol propane*

A reaction mixture of 1.5 mols 1,1,1-trimethylol propane, 5 mols MAA and 600 mls. toluene is heated for 3 hours at 107–140° C. and 2.3 hours at 140–148° C. and stripped to a pot temperature of 173° C. at 3 mm. mercury pressure. The residual liquid (540 g.) has a viscosity of D–E and an equivalent weight of 129 (acid value=435) compared to a theoretical value of 117.

*Example 4.—Mercaptopropionate of 1,1,1-trimethylol propane*

A reaction mixture of 1 mol 1,1,1-trimethylol propane, 4 mols MPA and 400 mls. toluene is heated for 4 hours at 118–130° C., for 2 hours at 130–150° C., and for 3.5 hours at 150–155° C. and stripped to a pot temperature of 175° C. at 3 mm. mercury pressure. The residual liquid (409 g.) has a viscosity of F– and will not titrate for acidity with NaOH using phenolphthalein as an indicator. The theoretical equivalent weight to mercaptan group would be 133.

*Example 5.—Mercaptoacetate of glycerol*

A reaction mixture of 1.33 mols glycerol, 5 mols of MAA and 400 mls. of toluene is heated for 1 hour at 108–115° C., 4.5 hours at 115–145° C., and 6.75 hours at 145–152° C. and stripped to a pot temperature of 170° C. at 2 mm. mercury pressure. The residual liquid (443 g.) has a viscosity of D–E and an equivalent weight of 120 (acid value=466) compared to a theoretical value of 104.

*Example 6.—Mercaptoacetate of 1,1,1-trimethylol ethane*

A reaction mixture of 1 mol 1,1,1-trimethylol ethane, 3.5 mols MAA and 92 mls. toluene is heated for 2.5 hours at 115–140° C. and 2.7 hours at 140–153° C. and stripped to a pot temperature of 169° C. at 2 mm. mercury pressure. The residual liquid (350 g.) has a viscosity of E and an equivalent weight of 132 (acid value=426) compared to a theoretical value of 112.

*Example 7.—Mercaptoacetate of pentaerythritol*

A reaction mixture of 0.75 mol pentaerythritol, 3.5 mols MAA and 60 mls. toluene is heated 1 hour at 112–134° C., 1 hour at 135–146° C., and 1.5 hours at 146–154° C. and stripped to a pot temperature of 168° C. at 3 mm. of mercury pressure. The residual liquid (337 g.) has a viscosity of R–S and an equivalent weight of 119 (acid value=470) compared to a theoretical value of 108.

*Example 8.—Mercaptoacetate of a copolymer of allyl alcohol and styrene*

The allyl alcohol-styrene copolymer used is a polyol having a softening point of 97° C., a molecular weight of 1150, and an average of 5.2 hydroxyl groups per molecule to give an equivalent weight of 222.

A reaction mixture of 1.5 equivalents of the copolymer, 2 mols MAA and 400 mls. toluene is heated 2.5 hours at 101–125° C. and 2.5 hours at 125–160° C. and stripped to a pot temperature of 163° C. at 3 mm. mercury pressure. The residual sticky solid has a viscosity at 50% nonvolatile in dioxane of F and an equivalent weight of 312 (acid value=180) compared to a theoretical value of 292.

*Example 9.—Mercaptoacetate of hydroxylated castor oil*

The polyol in this case is a hydroxylated castor oil having an average of 5 hydroxyl groups per molecule.

A reaction mixture of 300 g., 1.5 equivalents of the polyol, 2 mols MAA, and 200 mls. toluene is heated 2.75 hours at 112–130° C., 2.25 hours at 130–160° C. and 1.75 hours at 160–161° C. and stripped to a pot temperature of 161° C. at 7 mm. of mercury pressure to give a sticky solid having an equivalent weight of 456 (acid value=123).

*Example 10.—Mercaptoethanol ester of adipic acid*

A reaction mixture of 146 g. (1 mol) of adipic acid and 312 g. (4 mols) of mercaptoethanol, with sufficient toluene to give refluxing, is heated for 5 hours at 118–130° C. and 2.5 hours at 130–150° C. followed by vacuum stripping to a pot temperature of 157° C. at 20 mm. of mercury pressure to give 220 g. of a semisolid, amber-colored product.

*Example 11.—Mixed ester of pentaerythritol with MAA and soya bean oil acids*

A mixture of 685 g. (2.55 equivalents) of distilled soya bean oil acids, 259 g. (7.2 equivalents) of pentaerythritol and sufficient toluene to give constant reflux at 220° C. is heated to 220° C. and held at this temperature for 3 hours. The heat is removed and 500 mls. toluene added slowly with refluxing to cool to 100° C. The toluene solution is then filtered to recover unreacted pentaerythritol. The benzene-washed, unreacted pentaerythritol is dried, weighed and calculation made to indicate the partial ester composition to retain 5.7 equivalents of the original pentaerythritol, 2.55 equivalents as soya bean oil acid ester and 3.15 equivalents as unreacted hydroxyl content.

To the toluene solution of the partial ester is added 3.5 mols MAA and the mixture heated for 1 hour at 112–121° C., 1 hour at 121–144° C. and 3.75 hours at 144–146° C. and stripped to a pot temperature of 152° C. at 4 mm. mercury pressure. The residual liquid has a viscosity of W–X and an equivalent weight of 560 (acid value=100).

*Example 12.—Mixed ester of 1,1,1-trimethylol propane with MAA and dimerized soya bean oil acids*

A mixture of 300 grams (1 equivalent) of the dimerized acid and 134 grams (3 equivalents) of 1,1,1-trimethylol propane with sufficient toluene to give constant reflux is heated at 170–173° C. for 2 hours and at 180–183° C. for 0.5 hour to give the theoretical amount of water from esterification. The reaction mixture is then cooled to 100° C. by slowly adding toluene through the condenser. The mercaptoacetic acid (200 grams) is then added and the constantly stirred mixture again heated to reflux, removing some toluene along with the water of esterification to let the reaction temperature rise. The temperature is gradually raised from 114° C. to 132° C. over 1 hour, from 132° C. to 145° C. over 1.75 hours, and from 145° C. to 150° C. over 0.5 hour. The toluene and unreacted MAA is removed by stripping to a pot temperature of 52° C. at 2 mm. mercury pressure. The residual liquid (500 grams) has a viscosity of Z4–Z5 and an equivalent weight of 300 (acid value=187) compared to a theoretical value of 282.

All of the polymercaptans illustrated, both those indicated as being available as well as those the preparation of which is illustrated by the above examples, have at least two or more mercaptan groups which are positioned in the polymercaptan no further than 6 carbon atoms from a negative activating group. Where the negative activating group is a sulfide, the sulfide may be the sulfide in a mercaptan group where the mercaptan groups are not separated by a carbon chain of more than 6 carbon atoms.

The polymercaptan, as previously indicated, is reacted with an acid anhydride of the type described to produce the novel thioxypolyacid anhydride adduct of the present invention. These thioxypolyacid anhydrides contain at least two acid anhydride groups, each forming a part of a five-member closed ring. Each acid anhydride group has attached to its carbonyl radicals a sulfide group. The sulfide group is outside of the five-member ring and is attached to at least one of the carbonyl radicals through a 1 to 4 carbon chain. These compounds can also be generally illustrated by the general formula:

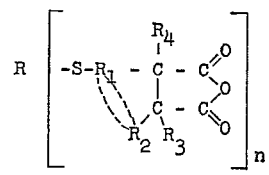

where
$n$ is 2 or more,
R is an n-valent organic radical,
$R_1$ is a hydrocarbon or alkyl, aryl or halogen substituted hydrocarbon chain of 0 to 3 carbons,
$R_2$ is —$CH_2$—$CH_2$— or an alkyl, aryl or halogen substituted derivative thereof when singly connected to $R_1$,
$R_2$ is

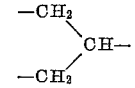

or an alkyl, aryl or halogen substituted derivative thereof when doubly connected to $R_1$,
$R_2$ is hydrogen, alkyl, aryl or halogen when not connected to $R_1$, and
$R_3$ and $R_4$ are hydrogen, alkyl, aryl or halogen.

The preferred thioxypolyacid anhydride adducts of the present invention are those formed by using maleic acid anhydride and its alkyl, aryl or halogen substituted derivatives. This class of carboxylic acid anhydrides may be represented by the general formula:

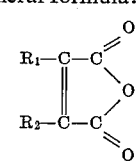

where $R_1$ and $R_2$ may be hydrogen, alkyl, aryl or halogen. For convenience, these will be referred to as maleic anhydrides and include, for example, maleic anhydride, methyl maleic anhydride (citraconic anhydride) and chloromaleic anhydride.

The next preferred thioxy polyacid anhydride adducts of the present invention are those formed of acid anhydrides in which the olefin group may be terminal. These are carboxylic acid anhydrides exemplified by itaconic acid anhydride and other succinic acid anhydride derivatives containing a terminal olefin group in the 1, 2, or 3 position to one of the carbonyl groups of the cyclic anhydride group. This class of carboxylic acid anhydrides is exemplified by the general formula:

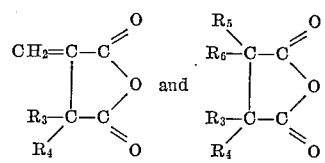

where $R_3$, $R_4$ and $R_5$ may be hydrogen, alkyl, aryl or halogen and $R_6$ is vinyl (—CH=$CH_2$) or allyl

(—$CH_2$CH=$CH_2$)

or substituted vinyl or allyl groups. For convenience, these will be referred to as olefin succinic anhydrides and include, for example, itaconic anhydride and allyl succinic anhydride.

A third class of carboxylic acid anhydrides are those in which the olefin group may be included in a six-member ring fused to the anhydride ring, as exemplified by the general formula:

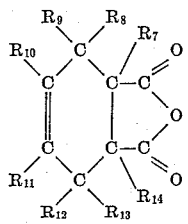

where $R_7$ through $R_{14}$ may be hydrogen, alkyl, aryl or halogen, and $R_8$ and $R_{12}$ together may be a methylene bridge (—$CH_2$—). For convenience, these will be referred to as tetrahydrophthalic anhydrides and include, for example, tetrahydrophthalic anhydride, methylbicyclo - [2.2.1]hept - 5 - ene - 2,3 - dicarboxylic anhydride (Nadic® methyl anhydride), and adducts of maleic anhydride with such conjugated dienes as myrcene.

The following examples illustrate the preparation of some of the thioxy polyacid anhydride adducts of the present invention.

The acid values reported in Examples 13 through 20 were determined as before by titration with alcoholic KOH. In this case it is the anhydride groups which are being titrated, one anhydride group titrating as two carboxyls. The reported equivalent weights calculated therefrom are the carboxyl equivalent weights. The anhydride equivalent weights are double these values. All softening points reported herein are determined by Durran's mercury method.

*Example 13.—Glycol dimercaptoacetate-maleic anhydride adduct*

A reaction mixture of 0.5 mol glycol dimercaptoacetate, 1 mol maleic anhydride and 500 mls. toluene is heated from 25° C. to 113° C. over 1 hour and held at 113–116° C. for 3 hours followed by stripping to a pot temperature of 177° C. at 5 mm. mercury pressure. The residual adduct (186 g.) has a softening point of 41° C., a viscosity of A5 at 50% nonvolatile in methyl ethyl ketone (MSK), and an equivalent weight of 117 (acid value=479).

*Example 14.—Glycol dimercaptoacetate-methyl nadic anhydride adduct*

A reaction mixture of 0.5 mol glycol dimercaptoacetate, 1 mol methyl nadic anhydride and 500 mls. toluene is heated over 1 hour from 26° C. to 114° C. and held at 114–115° C. for 3 hours followed by stripping to a pot temperature of 208° C. at 2 mm. mercury pressure. The residual adduct (195 g.) has a softening point of 40° C. and an equivalent weight of 167 (acid value=337).

*Example 15.—Triethylene glycol dimercaptoacetate-maleic anhydride adduct*

A reaction mixture of 150 g. of the product of Example 1, 1 mol of maleic anhydride and 333 mls. of toluene is heated over 1 hour from 25° C. to 110° C. and held for 3 hours at 110–115° C. followed by stripping to a pot temperature of 152° C. at 2 mm. of mercury pressure. The residual product (226 g.) has a softening point of 30° C., a viscosity of F at 75% nonvolatile in MEK and an equivalent weight of 135 (acid value=438).

*Example 16.—1,4-butanediol dimercaptoacetate-maleic anhydride adduct*

A reaction mixture of 240 g. of the product of Example 2, 2 mols maleic anhydride and 666 mls. of toluene is heated for 3.3 hours at 110–116° C. followed by stripping to a pot temperature of 173° C. at 3 mm. mercury pressure. The residual product (389 g.) has a softening point of 28° C., a viscosity of E at 75% nonvolatile in MEK and an equivalent weight of 160 (acid value= 350).

*Example 17.—Triethylene glycol dimercaptoacetate-citraconic anhydride adduct*

A reaction mixture of 150 g. of the product of Example 1, 1 mol citraconic anhydride and 333 mls. toluene is heated for 3 hours at 117–119° C. followed by stripping to a pot temperature of 160° C. at 7 mm. of mercury pressure. The residual liquid product (196 g.) has an equivalent weight of 160 (acid value=350).

*Example 18.—Glycerol trimercaptoacetate-maleic anhydride adduct*

A reaction mixture of 180 g. of the product of Example 5, 1.5 mols maleic anhydride and 400 mls. toluene is heated 0.75 hour at 118–119° C. followed by stripping to a pot temperature of 162° C. at 3 mm. mercury pressure. The solid residue, soluble in MEK, has a softening point of 100° C. and an equivalent weight of 124 (acid value=453).

*Example 19.—Tetramercaptoacetate of Example 12-maleic anhydride adduct*

A reaction mixture of 300 g. of the product of Example 12, 1.5 mols maleic anhydride and 500 mls. toluene is heated for 2 hours at 110–116° C. followed by stripping to 160° C. at 2 mm. mercury pressure. The residual product (390 g.) has a softening point of 30° C.

*Example 20.—Glycol dimercaptoacetate-itaconic anhydride adduct*

A reaction mixture of 1 mol glycol dimercaptoacetate, 2 mols of itaconic anhydride and 600 mls. of toluene is heated to 114° C. over 1 hour and held at 114–116° C. for 2 hours followed by stripping to a pot temperature of 180° C. at 3 mm. of mercury pressure. The residual adduct (385 g.) has a softening point of 50° C. and an equivalent weight of 124 (acid value=452).

As previously indicated, the highly functional thioxy polyacid anhydrides made in accordance with the present invention are excellent adducts for reacting with polyepoxides and with polyhydroxyl compounds for making a wide variety of resin products. Because of the wide variety of molecule types which can be incorporated into thioxy polyacid anhydrides of the present invention, and thus made available for further reaction with the polyepoxides or polyhydroxyl compounds, the adducts of the present invention make it possible to vary substantially the final properties of the resulting polyepoxide or polyhydroxyl compound resins into which the thioxy polyacid anhydrides have been built.

The conversion of polyepoxides with thioxy polyacid anhydrides of the present invention is illustrated by the following examples.

The term "equivalent amounts" as used in the following examples means amounts of polyepoxide and thioxy polyacid anhydride in the proportion of one epoxide equivalent weight of polyepoxide to one anhydride equivalent weight of thioxy polyacid anhydride.

*Example 21*

Thin coating films are prepared by making a 50% solution in MEK of the epoxy and the thioxy polyacid anhydride in the proportions indicated. This solution is spread on glass plate as 0.003″ wet films. The films, which are dried 1 hour at 100° C. give excellent cures forming tough resilient coating films. Also the films cured 0.5 hour at 150° C. form excellent hard flexible tack-free film products. The coating solutions are prepared by simple mixing of the epoxide with the thioxy polyacid anhydride in the MEK without the addition of any catalyst. The following mixes with epoxide compositions are illustrative.

(1) Equivalent amounts of 3,4-epoxy-6-methylcyclohexylmethyl - 3,4 - epoxy-6-methylcyclohexanecarboxylate (a commercial product sold under the trade name Unox 201; equivalent weight=160; sold by Union Carbide Chemicals Company) and the thioxy polyacid anhydride product of Example 13.

(2) One epoxide equivalent of Unox 201 and two anhydride equivalents of the thioxy polyacid anhydride product of Example 13.

(3) Equivalent amounts of liquid diglycidyl ether of Bisphenol A (a commercial product sold under the trade name Epon 828; equivalent weight=190; sold by Shell Chemical Corporation) and the thioxy polyacid anhydride product of Example 13.

(4) Equivalent amounts of Unox 201 and the thioxy polyacid anhydride product of Example 15.

(5) Two epoxide equivalents of Unox 201 and one anhydride equivalent of the thioxy polyacid anhydride product of Example 15.

(6) Equivalent amounts of Epon 828 and the thioxy polyacid anhydride product of Example 15.

(7) Equivalent amounts of a resin of the glycidyl ether-Bisphenol A type (sold commercially under the tradename Epon 1001; equivalent weight=525; sold by Shell Chemical Corporation) and the thioxy polyacid anhydride product of Example 15.

(8) Two epoxide equivalents of Epon 1001 and one anhydride equivalent of the thioxy polyacid anhydride product of Example 15.

(9) Two epoxide equivalents of Epon 828 and one anhydride equivalent of the thioxy polyacid anhydride product of Example 13.

(10) Two epoxide equivalents of Epon 1001 and one anhydride equivalent of the thioxy polyacid anhydride product of Example 13.

*Example 22*

Films formed in a similar manner to those of Example 21 are also obtained by baking the following reaction mixtures for 0.5 hour at 150° C. These films also have excellent properties and are hard, flexible and tack-free products.

(1) Equivalent amounts of Unox 201 and the thioxy polyacid anhydride product of Example 14.

(2) Equivalent amounts of a resin of the glycidyl ether-Bisphenol A type (sold commercially under the tradename Epon 1004; equivalent weight=950; sold by Shell Chemical Corporation) and the thioxy polyacid anhydride product of Example 15.

(3) Two epoxide equivalents of Epon 828 and one anhydride equivalent of the thioxy polyacid anhydride product of Example 15.

(4) Equivalent amounts of Epon 828 and the thioxy polyacid anhydride product of Example 18.

*Example 23*

The suitability of epoxy resins made in accordance with the present invention for use as potting compounds is illustrated by the preparation of ⅓″ thick conversions of the following 100% nonvolatile reaction mixtures. The reaction mixture, in each instance, is placed in a small dish about ½″ deep and 2″ in diameter to a depth of about ⅓″ and then subjected to the heating schedule indicated. Excellent uniform thick layers of the conversion products are obtained.

(1) Equivalent amounts of Unox 201 and the thioxy polyacid anhydride product of Example 13. The reaction mixture is heated for 1 hour at 100° C.

(2) Equivalent amounts of Epon 828 and the thioxy polyacid anhydride product of Example 13. The reaction mixture is heated for 1 hour at 150° C.

(3) One epoxide equivalent of Unox 201 and two anhydride equivalents of thioxy polyacid anhydride product of Example 13. The reaction mixture is heated for 1 hour at 100° C. followed by 0.5 hour at 150° C.

(4) One equivalent of Epon 828 and 0.8 equivalent of the thioxy polyacid anhydride product of Example 16. The reaction mixture is heated for 1 hour at 100° C. followed by 1 hour at 150° C.

(5) Equivalent amounts of Epon 828 and the thioxy polyacid anhydride product of Example 13. The reaction mixture is heated for 5 hours at 75° C. or for 1 hour at 75° C. followed by 1 hour at 100° C.

(6) Two epoxide equivalents of Epon 828 and one anhydride equivalent of the thioxy polyacid anhydride product of Example 13. The reaction mixture is heated for 1 hour at 75° C., 1 hour at 100° C. and 1 hour at 125° C.

(7) Equivalent amounts of Unox 201 and the thioxy polyacid anhydride product of Example 13. The reaction mixture is heated for 1 hour at 75° C., 1 hour at 100° C. and 1 hour at 125° C.

(8) Two epoxide equivalents of Unox 201 and one anhydride equivalent of the thioxy polyacid anhydride product of Example 13. The reaction mixture is heated for 1 hour at 75° C., 1 hour at 100° C., and 1 hour at 125° C.

Although only certain polyepoxides have been used in the examples, any polyepoxides may be used which contain terminal epoxide groups, epoxide groups attached to a ring, or terminal epoxide groups and epoxide groups attached to a ring. Examples of some of these are the glycidyl ethers and esters, the vinyl type and the epoxy cyclohexane type, as illustrated by the diepoxide from vinyl cyclohexene, which is commercially available under the tradename Unox 206, and the epoxy cyclohexane type, which is commercially available under the tradename Unox 201. In general, among the preferred polyepoxides are epoxidized cyclohexene and vinyl compounds containing 2 or more such olefin groups per molecule (Unox 201 and Unox 206 are diepoxides from such dienes); glycidyl ethers (most of these are based on polyhydric phenols as Bisphenol A and Novolacs, although many are based on polyhydric alcohols such as glycerol and 1,4-butanediol); and the glycidyl esters, such as polymers and copolymers of glycidyl acrylate.

The use of the thioxy polyacid anhydride adducts of the present invention in the preparation of resin materials from the polyhydroxyl compounds is illustrated by the following examples.

*Example 24*

A practical polyhydric alcohol is prepared by reacting 300 grams (1 equivalent to acid) of dimerized soya bean oil acids with 134 grams (3 equivalents to hydroxide) of 1,1,1-trimethylol propane, reacting in accordance with the procedure described in the first step of Example 12. A mixture of 21 grams of this alcohol with 39 grams of the anhydride of Example 19 in an aluminum dish to give approximately ½ inch thickness is baked 1 hour at 100° C. and 1 hour at 150° C. to give a tack-free, bubble-free, flexible resin.

*Example 25*

A mixture of 25 grams of the polyanhydride of Example 18 and 12 grams hydrogenated bis (4-hydroxyphenyl) dimethyl methane (the latter compound is known commercially as hydrogenated Bisphenol A and represents a special glycol) in a ½″ layer is heated for 2 hours at 100° C. to give a tack-free, infusible resin.

*Example 26*

A mixture of 25 grams of the polyanhydride of Example 20 and 4.5 grams of 1,1,1-trimethylol propane is heated in a ½″ layer for 2 hours at 100° C. to give an infusible, insoluble resin.

Insofar as we are aware, any polyhydroxyl compounds containing at least two hydroxyl groups may be used for reacting with the thioxy polyacid anhydride adducts. This includes the water-soluble starches, polyvinyl alcohols, polyallyl alcohols, copolymers of allyl and vinyl alcohols with other olefin monomers, polyhydric alcohols from the reaction of polyhydric phenols with chlorohydrins and epichlorohydrin, glycols of the ethylene and polyethylene- and propylene and polypropylene types, glycerol, hydrogenated sugars, trimethylol ethane, trimethylol propane, the pentaerythritols, partial esters of polyhydric alcohols such as mono glycerides and diglycerides of vegetable oil acids, and partial esters of dimerized and trimerized vegetable oil acids with pentaerythritol or trimethylol propane, castor oil, and hydroxylated vegetable oils.

In general, the preferred polyhydroxyl compounds are the partial esters of the polyhydric alcohols, such as the pentaerythritols, the triols and glycols with vegetable oil acids (mono, dimerized and trimerized); trihydric alcohols including glycerol, trimethylol propane and trimethylol ethane; glycols including ethylene, polyethylene, propylene and polypropylene glycols; pentaerythritols (mono, di and tri); castor oil: starches; and polyallyl alcohols.

Having thus described our invention, we claim:

1. A thioxy polyacid anhydride having the general formula:

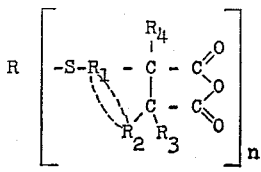

wherein:
n is at least 2,
R is an n-valent organic radical,
$R_1$ is a carbon chain of 0 to 3 carbons, S being connected directly to the acid anhydride ring

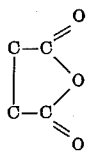

when the number of carbons of the carbon chain is 0,
said carbon chain, where the number of carbons is greater than 0 being any of the group consisting of hydrocarbon, alkyl substituted hydrocarbon, aryl substituted hydrocarbon, and halogen substituted hydrocarbon and wherein,
$R_2$ may have any of the positions with respect to $R_1$, consisting of (1) being not connected to $R_1$, (2) being singly connected to $R_1$, and (3) being doubly connected to $R_1$,
$R_2$ when not connected to $R_1$ being any of the group consisting of hydrogen, alkyl, aryl and halogen,
$R_2$ when singly connected to $R_1$ being of the group consisting of —$CH_2$—$CH_2$— and alkyl substituted, aryl substituted, and halogen substituted derivatives thereof,
$R_2$ when doubly connected to $R_1$ being of the group consisting of

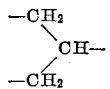

and alkyl substituted, aryl substituted, and halogen substituted derivatives thereof,
$R_3$ and $R_4$ are any one of the group consisting of hydrogen, alkyl, aryl and halogen.

2. A thioxy polyacid anhydride of claim 1 in which $R_2$ is H and in which the number of carbons in the carbon chain $R_1$ is zero.

3. A thioxy polyacid anhydride of claim 1 in which $R_2$, $R_3$, and $R_4$ are each H and in which the number of carbons in the carbon chain $R_1$ is zero.

4. A thioxy polyacid anhydride of claim 1 in which $R_4$ is any one of the group consisting of H and $CH_3$, the carbon chain of $R_1$ is one of the values consisting of 0 and 1 and where (1) $R_1$ is —$CH_2$—.

5. A resin conversion product formed by reacting a thioxy polyacid anhydride of claim 2 with at least one material of the group consisting of polyepoxides having a functionality of greater than one epoxy group per molecule and polyhydroxyl compounds having a functionality of greater than one hydroxyl group per molecule.

6. A resin conversion product of claim 5 in which the material of said group is a polyepoxide having a functionality of greater than one epoxy group per molecule.

7. A resin conversion product of claim 5 in which the material of said group is a polyhydroxyl compound having a functionality of greater than one hydroxyl group per molecule.

8. A resin conversion product formed by reacting a thioxy polyacid anhydride of claim 4 with at least one material of the group consisting of polyepoxides having a functionality of greater than one epoxy group per molecule and polyhydroxyl compounds having a functionality of greater than one hydroxyl group per molecule.

9. A resin conversion product of claim 8 in which the material of said group is a polyepoxide having a functionality of greater than one epoxy group per molecule.

10. A resin conversion product of claim 8 in which the material of said group is a polyhydroxyl compound having a functionality of greater than one hydroxyl group per molecule.

11. A thioxy poly itaconic acid anhydride containing at least two itaconic acid anhydride groups, each being attached to an organic sulfide group through a carbon of the carbon group consisting of the carbons having the alpha carbon position and the beta carbon position as removed from one of the carbonyl carbons in the itaconic acid anhydride group.

12. A resin conversion product formed by reacting a thioxy poly maleic anhydride of claim 10 with at least one material of the group consisting of polyepoxides having a functionality of greater than one epoxy group per molecule and polyhydroxyl compounds having a functionality of greater than one hydroxyl group per molecule.

13. A resin conversion product of claim 12 in which the material of said group is a polyepoxide having a functionality of greater than one epoxy group per molecule.

14. A resin conversion product formed by reacting a thioxy poly itaconic acid anhydride of claim 11 with at least one material of the group consisting of polyepoxides having a functionality of greater than one epoxy group per molecule and polyhydroxyl compounds having a functionality of greater than one hydroxyl group per molecule.

15. A resin conversion product of claim 14 in which the material of said group is a polyepoxide having a functionality of greater than one epoxy group per molecule.

References Cited

UNITED STATES PATENTS

| | | | |
|---|---|---|---|
| 2,294,259 | 8/1942 | Peski et al. | 260—78.4 |
| 2,527,374 | 10/1950 | Patrick et al. | 260—78.4 |
| 2,563,133 | 8/1951 | Patrick et al. | 260—78.4 |
| 2,831,830 | 4/1958 | Schroeder | 260—79 XR |
| 2,842,582 | 7/1958 | Jenner | 260—79 XR |

JOSEPH L. SCHOFER, *Primary Examiner.*

DONALD E. CZAJA, *Examiner.*

L. WOLF, L. G. CHILDERS, *Assistant Examiners.*